(12) United States Patent
Naitou et al.

(10) Patent No.: US 7,625,834 B2
(45) Date of Patent: Dec. 1, 2009

(54) PROCESS FOR PRODUCING CATALYSTS FOR THE PRODUCTION OF METHACRYLIC ACID

(75) Inventors: Hiroyuki Naitou, Hiroshima (JP); Takashi Karasuda, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 821 days.

(21) Appl. No.: 10/519,407

(22) PCT Filed: Jul. 4, 2003

(86) PCT No.: PCT/JP03/08521

§ 371 (c)(1),
(2), (4) Date: Jan. 5, 2005

(87) PCT Pub. No.: WO2004/004900

PCT Pub. Date: Jan. 15, 2004

(65) Prior Publication Data
US 2006/0041168 A1  Feb. 23, 2006

(30) Foreign Application Priority Data
Jul. 5, 2002  (JP) .............................. 2002-197356

(51) Int. Cl.
B01J 27/00 (2006.01)
B01J 27/198 (2006.01)
B01J 27/188 (2006.01)
B01J 27/19 (2006.01)
B01J 27/192 (2006.01)
B01J 27/185 (2006.01)
B01J 23/00 (2006.01)
B01J 23/32 (2006.01)
B01J 23/02 (2006.01)
B01J 23/04 (2006.01)
B01J 23/70 (2006.01)
B01J 23/72 (2006.01)
B01J 23/08 (2006.01)

(52) U.S. Cl. .................. 502/208; 502/209; 502/210; 502/211; 502/212; 502/213; 502/305; 502/308; 502/311; 502/317; 502/319; 502/321; 502/324; 502/325; 502/344; 502/345; 502/353; 502/355

(58) Field of Classification Search ........ 502/305–355, 502/208–213; 562/535, 353
See application file for complete search history.

(56) References Cited

U.S. PATENT DOCUMENTS

| | | | | |
|---|---|---|---|---|
| 5,126,307 A * | 6/1992 | Yamamoto et al. | .......... | 502/200 |
| 5,191,116 A * | 3/1993 | Yamamatsu et al. | .......... | 562/549 |
| 6,458,740 B2 * | 10/2002 | Kasuga et al. | .............. | 502/211 |
| 6,867,163 B2 * | 3/2005 | Takezawa et al. | ........... | 502/321 |
| 2004/0073062 A1 * | 4/2004 | Watanabe et al. | .......... | 562/535 |
| 2004/0192973 A1 * | 9/2004 | Liang et al. | ................ | 568/470 |
| 2005/0137081 A1 * | 6/2005 | Kauffman | ................... | 502/311 |

FOREIGN PATENT DOCUMENTS

| | | |
|---|---|---|
| JP | 4-182450 | 6/1992 |
| JP | 7-185354 | 7/1995 |
| JP | 2000-296336 | 10/2000 |
| WO | WO 2005/039760 | * 5/2005 |

OTHER PUBLICATIONS

U.S. Appl. No. 10/577,136, filed Apr. 25, 2006, Naitou, et al.

* cited by examiner

Primary Examiner—Patricia L Hailey
(74) Attorney, Agent, or Firm—Oblon, Spivak, McClelland, Maier & Neustadt, P.C.

(57) ABSTRACT

In a method of producing a catalyst for the production of methacrylic acid, which has a composition of the following formula (1), when mixing 100 parts by mass of a solution or a slurry (liquid A) containing molybdenum atoms, phosphorous atoms and vanadium atoms in which the content of ammonium species is 0 to 1.5 mol relative to 12 mol of the molybdenum atoms, 5 to 300 parts by mass of a solution or a slurry (liquid B) containing 6 to 17 mol of ammonium species relative to 12 mol of the molybdenum atoms contained in the liquid A and a solution or a slurry (liquid C) containing an element Z such as cesium, the liquid B is mixed with the liquid A, the liquid C or a mixture of the liquid A and the liquid C over 0.1 to 15 minutes $$P_a Mo_b V_c Cu_d X_e Y_f Z_g O_h \qquad (1).$$

15 Claims, No Drawings

PROCESS FOR PRODUCING CATALYSTS FOR THE PRODUCTION OF METHACRYLIC ACID

TECHNICAL FIELD

The present invention relates to a method of producing a catalyst for use in the production of methacrylic acid (hereinafter referred to as a catalyst for the production of methacrylic acid) by subjecting methacrolein to vapor phase catalytic oxidization with molecular oxygen, a catalyst for the production of methacrylic acid and a method of producing methacrylic acid.

BACKGROUND ART

Japanese Patent Application Laid-Open No. 2000-296336 describes a method of producing a catalyst for the production of methacrylic acid, which comprises mixing a solution or a slurry containing at least molybdenum, phosphorous and vanadium and a solution or a slurry containing an ammonium compound and to the obtained mixture or mixed slurry, adding a solution or a slurry containing potassium or the like.

However, the catalyst produced by the method described in this publication has an insufficient yield of methacrylic acid in some cases and an improved catalytic performance as an industrial catalyst is in demand.

DISCLOSURE OF THE INVENTION

An object of the present invention is to provide a catalyst for use in the production of methacrylic acid by subjecting methacrolein to vapor phase catalytic oxidization with molecular oxygen, which has a high yield of methacrylic acid, a method of producing the same and a method of producing methacrylic acid using the catalyst for the production of methacrylic acid.

The above-mentioned problem can be solved by the present invention described in the following. That is, the present invention relates to a method of producing a catalyst for the production of methacrylic acid, which is used for producing methacrylic acid by subjecting methacrolein to vapor phase catalytic oxidization with molecular oxygen and which has a composition of the following formula (1), wherein, when mixing 100 parts by mass of a solution or a slurry (liquid A) containing molybdenum atoms, phosphorous atoms and vanadium atoms in which the content of ammonium species is 0 to 1.5 mol relative to 12 mol of the molybdenum atoms, 5 to 300 parts by mass of a solution or a slurry (liquid B) containing 6 to 17 mol of ammonium species relative to 12 mol of the molybdenum atoms contained in the solution A and a solution or a slurry (liquid C) containing an element Z, the liquid B is mixed with the liquid A, liquid C or a mixture of the liquid A and the liquid C over 0.1 to 15 minutes:

$$P_aMo_bV_cCu_dX_eY_fZ_gO_h \quad (1)$$

in which P, Mo, V, Cu and O represent phosphorous, molybdenum, vanadium, copper and oxygen, respectively, X represents at least one element selected from the group consisting of antimony, bismuth, arsenic, germanium, zirconium, tellurium, silver, selenium, silicon, tungsten and boron, Y represents at least one element selected from the group consisting of iron, zinc, chromium, magnesium, tantalum, cobalt, manganese, barium, garium, cerium and lanthanum, Z represents at least one element selected from the group consisting of potassium, rubidium and cesium, a, b, c, d, e, f, g and h represent an atomic ratio of each element, and when b=12, a=0.5 to 3, c=0.01 to 3, d=0.01 to 2, e=0 to 3, f=0 to 3 and g=0.01 to 3, and h represents an atomic ratio of oxygen necessary for satisfying the valence of each of the above-mentioned components.

In the present invention, it is preferable to mix 5 to 100 parts by mass of the liquid C with the liquid A, the liquid B or a mixture of the liquid A and the liquid B over 0.1 to 30 minutes.

In the present invention, it is preferable that the liquid B be a solution or a slurry which contains substantially no phosphorous, molybdenum, vanadium, copper, element X, element Y or element Z. In addition, it is preferable that the liquid C be a solution or a slurry which contains substantially no phosphorous, molybdenum, vanadium, copper, element X, element Y or ammonium species.

The present invention also relates to a catalyst for the production of methacrylic acid, which is produced by the above-mentioned method.

In addition, the present invention relates to a method of producing methacrylic acid, which comprises subjecting methacrolein to vapor phase catalytic oxidization with molecular oxygen in the presence of the above-mentioned catalyst for the production of methacrylic acid.

According to the present invention, a catalyst for use in the production of methacrylic acid by subjecting methacrolein to vapor phase catalytic oxidization with molecular oxygen can be obtained which has a high yield of methacrylic acid.

BEST MODE FOR CARRYING OUT THE INVENTION

The catalyst produced according to the present invention is used for producing methacrylic acid by subjecting methacrolein to vapor phase catalytic oxidization with molecular oxygen, and has a composition of the following formula (1):

$$P_aMo_bV_cCu_dX_eY_fZ_gO_h \quad (1)$$

In the formula (1), P, Mo, V, Cu and O represent phosphorous, molybdenum, vanadium, copper and oxygen, respectively, X represents at least one element selected from the group consisting of antimony, bismuth, arsenic, germanium, zirconium, tellurium, silver, selenium, silicon, tungsten and boron, Y represents at least one element selected from the group consisting of iron, zinc, chromium, magnesium, tantalum, cobalt, manganese, barium, garium, cerium and lanthanum, Z represents at least one element selected from the group consisting of potassium, rubidium and cesium, a, b, c, d, e, f, g and h represent an atomic ratio of each element, and when b=12, a=0.5 to 3, c=0.01 to 3, d=0.01 to 2, e=0 to 3, f=0 to 3 and g=0.01 to 3, and h represents an atomic ratio of oxygen necessary for satisfying the valence of each of the above-mentioned components.

The catalyst for the production of methacrylic acid is produced by mixing a solution or a slurry (liquid A) containing molybdenum atoms, phosphorous atoms and vanadium atoms in which the content of ammonium species is 0 to 1.5 mol relative to 12 mol of the molybdenum atoms, a solution or a slurry (liquid B) containing 6 to 17 mol of ammonium species relative to 12 mol of the molybdenum atoms contained in the liquid A and a solution or a slurry (liquid C) containing an element Z.

The ammonium species refers to ammonia ($NH_3$) which can be converted to ammonium ($NH_4^+$) or ammonium contained in an ammonium-containing compound such as an ammonium salt.

<Preparation of Liquid A>

The liquid A is prepared by dissolving or suspending at least compounds of molybdenum, phosphorous and vanadium in a solvent. The liquid A may contain, in addition to the molybdenum atoms, the phosphorous atoms and the vanadium atoms, copper atoms, an element X, an element Y, an element Z and ammonium species.

The amount of the ammonium species contained in the liquid A is 0 to 1.5 mol, preferably 0 to 1.0 mol relative to 12 mol of the molybdenum atoms. By setting the amount of the ammonium species to this range, a catalyst having a high yield can be obtained. The amount of the ammonium species contained in the liquid A can be adjusted by the amount of the catalyst raw material containing these or ammonia.

As for the amount of the element Z which is contained in the liquid A, less one is preferable, it is more preferable not to be substantially contained.

As the raw material of the catalyst used for preparing liquid A, an oxide, a nitrate, a carbonate and an ammonium salt of each element can be used by selecting appropriately. For example, examples of the raw material of molybdenum preferably include a compound which does not contain ammonium such as molybdenum trioxide and molybdic acid, but a small amount of various ammonium molybdates such as ammonium paramolybdate, ammonium dimolybdate and ammonium tetramolybdate may also be used. As the raw material of phosphorous, orthophosphoric acid, phosphorus pentoxide and ammonium phosphate can be used. As the raw material of vanadium, vanadium pentoxide and ammonium metavanadate can be used. In addition, as the raw material of molybdenum, phosphorous and vanadium, heteropoly acids such as phosphomolybdic acid, molybdovanadophosphoric acid and ammonium phosphomolybdate may also be used. For each element, one or a combination of two or more kinds of the raw materials of the catalyst components may be used.

Examples of the solvent for the liquid A include water, ethyl alcohol and acetone, and it is preferable to use water. The amount of the solvent in the liquid A is not particularly limited but the content ratio (mass ratio) of the molybdenum compound contained in the liquid A to the solvent is preferably 1:0.1 to 1:100, more preferably 1:0.5 to 1:50. By setting the amount of the solvent to this range, a catalyst having a high yield can be obtained.

The liquid A may be prepared by stirring at room temperature, but it is preferable to prepare by stirring under heating. The heating temperature is preferably not lower than 80° C., more preferably not lower than 90° C. The heating temperature is preferably not higher than 150° C., more preferably not higher than 130° C. By setting the heating temperature to this range, a catalyst having a high activity can be obtained. The heating time is preferably not less than 0.5 hour, more preferably not less than 1 hour. By setting the heating time to this range, the reaction of the catalyst raw materials proceeds sufficiently. The heating time is preferably not more than 24 hours, more preferably not more than 12 hours.

<Preparation of Liquid B>

The liquid B is prepared by dissolving or suspending an ammonium species-containing compound in a solvent. The liquid B may contain, in addition to an ammonium species-containing compound, phosphorous atoms, molybdenum atoms, vanadium atoms, copper atoms, an element X, an element Y and an element Z, but these elements are preferably not contained substantially.

The amount of the ammonium species contained in the liquid B is not less than 6 mol, preferably not less than 7 mol relative to 12 mol the molybdenum atoms contained in the liquid A. In addition, the amount of the ammonium species contained in the liquid B is not more than 17 mol, preferably not more than 15 mol relative to 12 mol the molybdenum atoms contained in the liquid A. By setting the amount of the ammonium species to this range, a catalyst having a high yield can be obtained.

The ammonium species-containing compound used for preparing the liquid B means ammonia or various ammonium salts, and specific examples include ammonia (aqueous ammonia), ammonium carbonate, ammonium hydrocarbonate and ammonium nitrate. One or a combination of two or more kinds of the ammonium species-containing compounds may be used.

Examples of the solvent for the liquid B include water, ethyl alcohol and acetone, and it is preferable to use water. The amount of the solvent in the liquid B is not particularly limited but the content ratio (mass ratio) of the ammonium species-containing compound contained in the liquid B to the solvent is preferably 1:0.1 to 1:100, more preferably 1:0.5 to 1:50. By setting the amount of the solvent to this range, a catalyst having a high yield can be obtained.

The liquid B may be prepared by stirring at room temperature, but it may be prepared by heating up to about 80° C., if necessary. However, in the case of using aqueous ammonia which is an ammonium species-containing compound as it is, such preparation step is not necessarily required because aqueous ammonia contains water which is a solvent.

<Preparation of Liquid C>

The liquid C is prepared by dissolving or suspending at least a compound of element Z in a solvent.

The liquid C may contain, in addition to the element Z, molybdenum atoms, phosphorous atoms, vanadium atoms, copper atoms, an element X, an element Y and ammonium species, but these elements and ammonium species are preferably not contained substantially.

In the present invention, the element Z is preferably cesium because a superior effect can be achieved.

As the catalyst raw material of the element Z, a nitrate, a carbonate and a hydroxide of each element can be used by selecting appropriately. For example, as the raw material of cesium, a cesium nitrate, a cesium carbonate and a cesium hydroxide can be used. For each element, one or a combination of two or more kinds of the catalyst raw materials may be used.

Examples of the solvent for the liquid C include water, ethyl alcohol and acetone, and it is preferable to use water. The amount of the solvent in the liquid C is not particularly limited but the content ratio (mass ratio) of the the raw material of element Z contained in the liquid C to the solvent is preferably 1:0.1 to 1:100, more preferably 1:0.5 to 1:50.

The liquid C may be prepared by stirring at room temperature, but it may be prepared by heating up to about 80° C., if necessary.

<Mixing of Liquid A, Liquid B and Liquid C>

In the present invention, the method of mixing the liquid A, the liquid B and the liquid C is not particularly limited. For example, any method, such as a method in which a mixed liquid AB by mixing liquid A and liquid B is mixed with liquid C, a method in which a mixed liquid AC by mixing liquid A and liquid C is mixed with liquid B, and a method in which a mixed liquid BC by mixing liquid B and liquid C is mixed with liquid A, can be adopted. Of these, the method in which a mixed liquid AC by mixing liquid A and liquid C is mixed with liquid B is preferable. Alternatively, liquid B and/or liquid C may be mixed by dividing into two or more portions and examples thereof include a method in which a mixed liquid $ABC_1$ by mixing A, part of liquid C (liquid $C_1$) and liquid B is mixed with the rest of the liquid C (liquid $C_2$), and a method in which a mixed liquid $AB_1C$ by mixing liquid A, part of liquid B (liquid $B_1$) and liquid C is mixed with the rest of the liquid B (liquid $B_2$). At this stage, the ratio (molar ratio) of the catalyst raw materials contained in the liquid $C_1$ (or liquid $B_1$) to the catalyst raw materials contained in the liquid $C_2$ (or liquid $B_2$) can be changed to any ratio ranging from 0:100 to 100:0, and the ratio is preferably 10:90 to 90:10, particularly preferably 20:80 to 80:20. Mixing is usually carried out with stirring.

In the present invention, the amount of the liquid B is 5 to 300 parts by mass, preferably 10 to 200 parts by mass relative to 100 parts by mass of the liquid A. The present inventors have found that the time for mixing the liquid B with other liquids has a great influence on the performance of the catalyst to be produced and that a catalyst having a particularly high yield of methacrylic acid can be obtained by specifying the mixing time. The mixing time was not at all studied in Japanese Patent Application Laid-Open No. 2000-296336. In the present invention, the time for mixing liquid B with other liquids is 0.1 to 15 minutes. The mixing time is preferably not less than 0.5 minute, and more preferably not less than 1 minute. The mixing time is not more than 14 minutes, and more preferably not more than 13 minutes. Here, the "mixing time" refers to the time for adding all of the liquid B to other liquids and in the case of mixing by dropping, the time refers to the dropping time and the stirring after dropping is not included. In addition, in the case of adding liquid B in portions, the time is until all of the liquid is mixed, that is, the total of the mixing time of each portion.

Further, the amount of the liquid C is preferably 5 to 100 parts by mass, more preferably 10 to 70 parts by mass relative to 100 parts by mass of the liquid A. The time for mixing the liquid C with other liquids is not particularly limited, but it is usually 0.1 to 30 minutes. The mixing time is preferably not less than 0.5 minute, and more preferably not less than 1 minute. The mixing time is preferably not more than 28 minutes, and more preferably not more than 25 minutes. The mixing time in this case is synonymous with the above mixing time of the liquid B.

In the present invention, the liquid B and/or the liquid C prepared may be divided or the liquids may be prepared separately. In the case of separate preparation, each may be prepared using the same raw materials or different raw materials as long as the liquid B contains the essential ammonium species and the liquid C contains the essential element Z. In addition, the content ratio of the raw materials and the content ratio of the solvent in each divided liquid of the liquid B and/or the liquid C may be the same or different.

Mixed liquids of liquid A, liquid B and liquid C may be prepared at room temperature, but may be prepared by heating. Each temperature at the time of mixing is preferably not more than 100° C., and more preferably not more than 80° C. By preparing mixed liquids of liquid A, liquid B and liquid C at such a temperature range, a catalyst having a high activity can be obtained. In addition, the heating time is not particularly limited and may be determined appropriately.

In the case that the liquids A, B and C do not contain copper or element Y, any method may be employed, such as a method in which copper or the element Y is added to the mixed liquid AB in which liquid A and liquid B are mixed and the obtained liquid is mixed with liquid C; a method in which copper or the element Y is added to the mixed liquid AC in which liquid A and liquid C are mixed and the obtained liquid is mixed with liquid B; a method in which copper or the element Y is added to the mixed liquid BC in which liquid B and liquid C are mixed and the obtained liquid is mixed with liquid A; or a method in which copper or the element Y is added to the mixed liquid ABC prepared according to the above-mentioned method. Of these, however, the method of mixing copper or the element Y after preparing the mixed liquid ABC or the mixed liquid AB is preferable. Here, it is particularly preferable to add copper or the element Y by dissolving or suspending these catalyst raw materials in a solvent. As the catalyst raw materials of copper and the element Y, a nitrate, a carbonate or a hydroxide of each element can be used by selecting appropriately. For example, as the raw material of copper, copper nitrate and copper oxide can be used.

When an element X is to be incorporated in the catalyst composition, a method of adding a raw compound of the element X to the liquid A is preferable. As the raw material of element X, a nitrate, a carbonate, an oxide or a hydroxide of each element can be used by selecting appropriately.

<Drying and Calcination>

In the next step, the thus obtained solution or slurry containing all the catalyst raw materials is dried to give a dried catalyst precursor.

As the drying method, various methods such as evaporation to dryness method, a spray drying method, a drum drying method and a flash drying method can be employed. The types of the dryer used for drying and the temperature and the time for drying are not particularly limited, and an aimed dried catalyst precursor can be obtained by changing the drying conditions.

The thus obtained dried catalyst precursor is pulverized if necessary and may be subjected to the subsequent calcination without molding, but usually a molded product is calcined.

The molding method is not particularly limited and a various known dry- or wet-molding methods can be employed, and it is preferable to conduct molding without adding a carrier such as silica. Concrete methods of molding include, for example, tablet molding, compression molding, extrusion molding and granulation molding. The shape of the molded product is not particularly limited and for example, desired shapes such as a column, a ring or a ball may be selected.

In the molding, known additives such as graphite and talc may be added in small amounts.

The thus obtained dried catalyst precursor or a molded product thereof is subjected to calcination to obtain a catalyst for the production of methacrylic acid.

The method of calcination and the conditions of calcination are not particularly limited and known methods and conditions can be employed. The optimal calcination conditions are different depending on the catalyst raw materials to be used, the catalyst composition and the preparation method, but the calcination is usually conducted under a stream of oxygen-containing gas such as air or inert gas at 200 to 500° C., preferably 300 to 450° C. for not less than 0.5 hour, preferably 1 to 40 hours. Here, the inert gas refers to a gas that does not reduce the reactivity of the catalyst and specific examples thereof include nitrogen, carbon dioxide gas, helium and argon.

<Method of Producing Methacrylic Acid>

Next, the method of producing methacrylic acid of the present invention is described. The method of producing methacrylic acid of the present invention comprises subjecting methacrolein to vapor phase catalytic oxidization with molecular oxygen in the presence of a catalyst of the present invention obtained as described above.

The reaction is usually carried out on a fixed bed. The catalyst layer may be one or more, and the catalyst may be held on a carrier or may be added other additive components.

When producing methacrylic acid using the catalyst of the present invention described above, a material gas containing methacrolein and molecular oxygen is contacted with the catalyst.

The concentration of methacrolein in the material gas may be varied in a wide range, but it is usually 1 to 20% by volume, more preferably 3 to 10% by volume.

As the source of molecular oxygen, it is economical to use air but air enriched with pure oxygen may also be used where necessary. The concentration of molecular oxygen in the material gas is usually 0.4 to 4 moles, and more preferably 0.5 to 3 moles relative to 1 mole of methacrolein.

A material gas in which methacrolein and molecular oxygen source are diluted by inert gas such as nitrogen or carbon dioxide gas may also be used.

In addition, steam may be added to the material gas. When the reaction is conducted in the presence of water, methacrylic acid can be obtained at a higher yield. The concentration of steam in the material gas is preferably 0.1 to 50% by volume, and more preferably 1 to 40% by volume.

The material gas may contain a small amount of impurities such as lower saturated aldehyde, but the amount is preferably as small as possible.

The reaction pressure employed in the reaction for producing methacrylic acid is from atmospheric pressure to several atmospheric pressures. Generally, the reaction temperature can be selected within the range of 230 to 450° C., more preferably 250 to 400° C.

The flow rate of the material gas is not particularly limited but it is usually adjusted so that the contact time of the material gas and the catalyst is preferably 1.5 to 15 seconds, more preferably 2 to 5 seconds.

The mechanism which improves the performance of the catalyst obtained by the production method of the present invention is not clear, but the reason is assumed to be because a crystal structure which enables high yield production of methacrylic acid is formed by controlling the method of mixing the raw materials of the catalyst and the amount of ammonia and/or ammonium containing compound in the liquid A and liquid B to a specified amount.

In the following, the present invention is explained in more detail with reference to Examples and Comparative Examples, but the present invention is not limited to these Examples.

"Part(s)" in Examples and Comparative Examples mean "part(s) by mass". The composition of the catalyst was determined based on the amount of charge of raw materials of the catalyst components. The analysis of the material gas for the reaction and the product was conducted by using gas chromatography. Further, the amount of ammonia and ammonium in the liquid was measured by a Kjeldahl method.

The conversion of methacrolein, the selectivity of the produced methacrylic acid and the one pass yield of methacrylic acid are defined as follows.

Conversion of methacrolein (%)=(B/A)×100

Selectivity of methacrylic acid (%)=(C/B)×100

One pass yield of methacrylic acid (%)=(C/A)×100

Where, symbol A represents the number of moles of supplied methacrolein, symbol B represents the number of moles of reacted methacrolein and symbol C represents the number of moles of produced methacrylic acid.

EXAMPLE 1

Preparation of Liquid A

To 200 parts of pure water were added 100 parts of molybdenum trioxide, 6.68 parts of 85% by mass phosphoric acid, 2.63 parts of vanadium pentaoxide and 2.74 parts of 60% aqueous arsenate solution and stirring was conducted for 5 hours under reflux to prepare 312.05 parts of liquid A. The amount of ammonium contained in the liquid A was 0 mol relative to 12 mol of the molybdenum atoms contained in the liquid A.

(Preparation of Liquid B)

39.44 parts of 25% by mass aqueous ammonia was used as liquid B. The amount of ammonium contained in the liquid B was 10.0 mol relative to 12 mol of the molybdenum atoms contained in the liquid A.

(Preparation of Liquid C)

13.54 parts of cesium nitrate was dissolved in 28.43 parts of pure water to prepare 41.97 parts of liquid C.

(Mixing of Liquid A, Liquid B and Liquid C)

After cooling the liquid A to 50° C., the liquid C was added to the liquid A for 5.5 minutes with stirring, and stirring was conducted for 10 minutes to prepare a mixed liquid AC. Then, the temperature of the liquid AC was increased to 70° C. and the liquid B was added to the liquid AC for 3 minutes to prepare a mixed liquid ABC and stirring was conducted for 90 minutes.

With stirring the thus obtained liquid ABC at a liquid temperature of 70° C., thereto were added a solution in which 2.80 parts of cupric nitrate was dissolved in 5.60 parts of pure water and a solution in which 1.18 parts of ferric nitrate was dissolved in 2.36 parts of pure water to prepare a slurry containing a catalyst precursor.

The slurry containing a catalyst precursor was heated to 101° C. and subjected to evaporation to dryness with stirring. The obtained solid was dried at 130° C. for 16 hours and the dried product was compression-molded and calcined under air stream at 380° C. for 12 hours to obtain a catalyst. The composition of the obtained catalyst was:

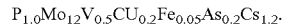

$P_{1.0}Mo_{12}V_{0.5}Cu_{0.2}Fe_{0.05}As_{0.2}Cs_{1.2}$.

(Synthesis Reaction of Methacrylic Acid)

A reaction tube was charged with the catalyst and a mixed gas containing 5% of methacrolein, 10% of oxygen, 30% of steam and 55% of nitrogen (here, "%" means "% by volume") was passed under atmospheric pressure at a reaction temperature of 290° C. for a contact time of 3.6 sec. The results are shown in Table 1.

EXAMPLE 2

Preparation of the catalyst and the reaction were carried out in the same manner as in Example 1 except that the mixing time of the liquid B in Example 1 was changed to 8 minutes. The results are shown in Table 1.

EXAMPLE 3

Preparation of the catalyst and the reaction were carried out in the same manner as in Example 1 except that the mixing time of the liquid B in Example 1 was changed to 13 minutes. The results are shown in Table 1.

EXAMPLE 4

Preparation of the catalyst and the reaction were carried out in the same manner as in Example 3 except that the mixing time of the liquid C in Example 3 was changed to 35 minutes. The results are shown in Table 1.

EXAMPLE 5

Preparation of the catalyst and the reaction were carried out in the same manner as in Example 1 except that the mixing time of the liquid B in Example 1 was changed to 1 minute. The results are shown in Table 1.

EXAMPLE 6

Preparation of the catalyst and the reaction were carried out in the same manner as in Example 1 except that in Example 1, 29.58 parts of 25% by mass aqueous ammonia was used as liquid B (the amount of ammonium contained in the liquid B was 7.5 mol relative to 12 mol of the molybdenum atoms contained in the liquid A) and the mixing time of the liquid B was changed to 1.5 minutes. The results are shown in Table 1.

EXAMPLE 7

Preparation of the catalyst and the reaction were carried out in the same manner as in Example 1 except that in Example 1, 55.21 parts of 25% by mass aqueous ammonia was used as liquid B (the amount of ammonium contained in the liquid B was 14.0 mol relative to 12 mol of the molybdenum atoms contained in the liquid A) and the mixing time of the liquid B was changed to 4.0 minutes. The results are shown in Table 1.

EXAMPLE 8

Preparation of the catalyst and the reaction were carried out in the same manner as in Example 1 except that the mixing time of the liquid C in Example 1 was changed to 0.8 minute. The results are shown in Table 1.

COMPARATIVE EXAMPLE 1

Preparation of the catalyst and the reaction were carried out in the same manner as in Example 1 except that the mixing time of the liquid B in Example 1 was changed to 0.05 minute. The results are shown in Table 1.

COMPARATIVE EXAMPLE 2

Preparation of the catalyst and the reaction were carried out in the same manner as in Example 1 except that the mixing time of the liquid B in Example 1 was changed to 20 minutes. The results are shown in Table 1.

EXAMPLE 9

Preparation of Liquid A

To 300 parts of pure water were added 100 parts of molybdenum trioxide, 7.34 parts of 85% by mass phosphoric acid, 6.10 parts of ammonium metavanadate and 0.60 parts of germanium dioxide and stirring was conducted for 8 hours under reflux to prepare 414.04 parts of liquid A. The amount of ammonium contained in the liquid A was 0.9 mol relative to 12 mol of the molybdenum atoms contained in the liquid A.

(Preparation of Liquid B)

45.36 parts of 25% by mass aqueous ammonia was used as liquid B. The amount of ammonium contained in the liquid B was 11.5 mol relative to 12 mol of the molybdenum atoms contained in the liquid A.

(Preparation of Liquid C)

19.10 parts of 50% cesium hydroxide was dissolved in 38.20 parts of pure water to prepare 57.30 parts of liquid C. 60% by mass of the liquid C was used as liquid CI (34.38 parts) and 40% by mass of the liquid C was used as liquid CII (22.92 parts).

(Mixing of Liquid A, Liquid B and Liquid C)

After cooling the liquid A to 60° C., the liquid CI was added to the liquid A for 2.5 minutes with stirring, and stirring was conducted for 10 minutes to prepare a mixed liquid ACI. The liquid B was added to the liquid ACI for 2 minutes to prepare a mixed liquid ABCI and stirring was conducted for 10 minutes. Further, the liquid CII was added to the liquid ABCI for 1.5 minutes to prepare a mixed liquid ABC.

With stirring the thus obtained liquid ABC, thereto were added a solution in which 1.40 parts of cupric nitrate was dissolved in 2.80 parts of pure water and a solution in which 3.44 parts of zinc nitrate was dissolved in 3.44 parts of pure water and stirring was conducted for 30 minutes to prepare a slurry containing a catalyst precursor.

The slurry containing a catalyst precursor was heated to 101° C. and subjected to evaporation to dryness with stirring. The obtained solid was dried at 130° C. for 16 hours and the dried product was subjected to pressing and calcined under air stream at 375° C. for 10 hours to obtain a catalyst. The composition of the obtained catalyst was:

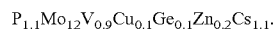

$P_{1.1}Mo_{12}V_{0.9}Cu_{0.1}Ge_{0.1}Zn_{0.2}Cs_{1.1}$.

The results of the reaction conducted using this catalyst in the same manner as in Example 1 are shown in Table 1.

EXAMPLE 10

Preparation of the catalyst and the reaction were carried out in the same manner as in Example 9 except that in Example 9, the mixing time of the liquid CI was changed to 13 minutes and the mixing time of the liquid CII was changed to 0.6 minute. The results are shown in Table 1.

COMPARATIVE EXAMPLE 3

Preparation of the catalyst and the reaction were carried out in the same manner as in Example 9 except that the mixing time of the liquid B in Example 9 was changed to 40 minutes. The results are shown in Table 1.

EXAMPLE 11

Preparation of Liquid A

To 400 parts of pure water were added 100 parts of molybdenum trioxide, 8.88 parts of 85% by mass phosphoric acid, 4.74 parts of ammonium metavanadate and 4.11 parts of 60% aqueous arsenic acid solution and stirring was conducted in an autoclave under saturated vapor at 120° C. for 3 hours to prepare 517.7 parts of liquid A. The amount of ammonium contained in the liquid A was 0.7 mol relative to 12 mol of the molybdenum atoms contained in the liquid A.

(Preparation of Liquid B)

37.0 parts of ammonium carbonate was dissolved in 80 parts of pure water to prepare 117.0 parts of liquid B. The amount of ammonium contained in the liquid B was 9.2 mol relative to 12 mol of the molybdenum atoms contained in the liquid A.

(Preparation of Liquid C)

18.0 parts of cesium bicarbonate was dissolved in 30 parts of pure water to prepare 48.0 parts of liquid C.

(Mixing of Liquid A, Liquid B and Liquid C)

After cooling the liquid A to 60° C., the liquid B was added to the liquid A for 2.5 minutes with stirring, and stirring was conducted for 15 minutes to prepare a mixed liquid AB. The amount of ammonium species in the lilquid AB was 14 mol relative to 12 mol of the molybdenum atoms. Then, a solution in which 1.40 parts of cupric nitrate was dissolved in 10 parts of pure water, a solution in which 2.34 parts of ferric nitrate was dissolved in 10 parts of pure water and 1.00 part of cerium oxide were added in sequence and with stirring the mixture, the liquid C was added dropwise for 7.5 minutes, and stirring was conducted for 15 minutes to prepare a slurry.

The slurry containing a catalyst precursor was heated to 101° C. and subjected to evaporation to dryness with stirring. The obtained solid was dried at 130° C. for 16 hours and the dried product was subjected to pressing, calcined under nitrogen stream at 400° C. for 5 hours and further calcined under air stream at 340° C. for 10 hours to obtain a catalyst. The composition of the obtained catalyst was:

$P_{1.3}Mo_{12}V_{0.7}Cu_{0.1}Fe_{0.1}As_{0.3}Ce_{0.1}Cs_{1.6}.$

The results of the reaction conducted using this catalyst in the same manner as in Example 1 are shown in Table 1.

COMPARATIVE EXAMPLE 4

Preparation of the catalyst and the reaction were carried out in the same manner as in Example 11 except that in Example 11, the mixing time of the liquid B was changed to 30 minutes and the mixing time of the liquid C was changed to 35 minutes. The results are shown in Table 1.

TABLE 1

| | Amount of ammonium species in liquid B[1] | Mass[2] (part) Liquid B | Mass[2] (part) Liquid C[3] | Mixing time (min) Liquid B | Mixing time (min) Liquid C[3] | Conversion of methacrolein (%) | Selectivity of methacrylic acid (%) | Yield of methacrylic add (%) |
|---|---|---|---|---|---|---|---|---|
| Example 1 | 10.0 | 12.64 | 13.45 | 3.0 | 5.5 | 82.5 | 87.6 | 72.3 |
| Example 2 | 10.0 | 12.64 | 13.45 | 8.0 | 5.5 | 83.0 | 87.0 | 72.2 |
| Example 3 | 10.0 | 12.64 | 13.45 | 13.0 | 5.5 | 82.7 | 87.5 | 72.4 |
| Example 4 | 10.0 | 12.64 | 13.45 | 13.0 | 25.0 | 82.0 | 87.9 | 72.1 |
| Example 5 | 10.0 | 12.64 | 13.45 | 1.0 | 5.5 | 81.3 | 88.0 | 71.5 |
| Example 6 | 7.5 | 9.48 | 13.45 | 1.5 | 5.5 | 81.1 | 87.9 | 71.3 |
| Example 7 | 14.0 | 17.69 | 13.45 | 4.0 | 5.5 | 82.0 | 87.5 | 71.8 |
| Example 8 | 10.0 | 12.64 | 13.45 | 3.0 | 0.8 | 80.8 | 88.1 | 71.2 |
| Comparative Example 1 | 10.0 | 12.64 | 13.45 | 0.05 | 5.5 | 81.0 | 85.7 | 69.4 |
| Comparative Example 2 | 10.0 | 12.64 | 13.45 | 20.0 | 5.5 | 81.8 | 84.0 | 68.7 |
| Example 9 | 11.5 | 10.96 | 8.30 / 5.54 | 2.0 | 2.5 / 1.5 | 84.5 | 86.1 | 72.8 |
| Example 10 | 11.5 | 10.96 | 8.30 / 5.54 | 2.0 | 13.0 / 0.6 | 85.0 | 84.5 | 71.8 |
| Comparative Example 3 | 11.5 | 10.96 | 8.30 / 5.54 | 40.0 | 2.5 / 1.5 | 82.5 | 84.3 | 69.5 |
| Example 11 | 9.2 | 78.04 | 15.53 | 2.5 | 7.5 | 81.1 | 85.8 | 69.6 |
| Comparative Example 4 | 9.2 | 78.04 | 15.53 | 30.0 | 35.0 | 81.2 | 83.6 | 67.9 |

[1] Number of moles relative to 12 mol of molybdenum in liquid A
[2] Mass based on 100 parts by mass of liquid A
[3] Of the two lines, upper line indicating value of liquid CI, lower line indicating value of liquid CII

INDUSTRIAL APPLICABILITY

The catalyst for the preparation methacrylic acid obtained by the present invention is a catalyst which has a high conversion rate of methacrolein which is the raw material and high selectivity of methacrylic acid, and in particular, is excellent in single flow yield of methacrylic acid. In addition, since such excellent catalyst can be obtained by an extremely simple method of specifying the mixing time of the liquid B, no large modification of the operational process is necessary and the method can be readily applied to the current production processes.

The invention claimed is:

1. A method of producing a catalyst, having a composition of the following formula (1), wherein said catalyst is useful for production of methacrylic acid by subjecting methacrolein to vapor phase catalytic oxidization with molecular oxygen, said method comprising mixing
100 parts by mass of a solution or a slurry (liquid A), containing molybdenum atoms, phosphorous atoms and vanadium atoms, in which the content of ammonium species is 0 to 1.5 mol relative to 12 mol of the molybdenum atoms,
5 to 300 parts by mass of a solution or a slurry (liquid B), containing 6 to 17 mol of ammonium species relative to 12 mol of the molybdenum atoms contained in the solution A, and
a solution or a slurry (liquid C), containing an element Z, wherein the liquid B is mixed with the liquid A, the liquid C or a mixture of the liquid A and the liquid C over a period of 0.1 to 15 minutes:

$$P_aMo_bV_cCu_dX_eY_fZ_gO_h \qquad (1),$$

wherein P, Mo, V, Cu and O represent phosphorous, molybdenum, vanadium, copper and oxygen, respectively; X represents at least one element selected from the group consisting of antimony, bismuth, arsenic, germanium, zirconium, tellurium, silver, selenium, silicon, tungsten and boron; Y represents at least one element selected from the group consisting of iron, zinc, chromium, magnesium, tantalum, cobalt, manganese, barium, gallium, cerium and lanthanum; Z represents at least one element selected from the group consisting of potassium, rubidium and cesium; a, b, c, d, e, f, g and h represent an atomic ratio of each element, and when $b=12$, $a=0.5$ to 3, $c=0.01$ to 3, $d=0.01$ to 2, $e=0$ to 3, $f=0$ to 3 and $g=0.01$ to 3, and h represents an atomic ratio of oxygen necessary for satisfying the valence of each of the above-mentioned components.

2. The method according to claim 1, wherein 5 to 100 parts by mass of the liquid C is mixed with the liquid A, or a mixture of the liquid A and the liquid B over 0.1 to 30 minutes.

3. The method according to claim 1, wherein the liquid B is a solution or a slurry which contains substantially no phosphorous, molybdenum, vanadium, copper, element X, element Y or element Z.

4. The method according to claim 1, wherein the liquid C is a solution or a slurry which contains substantially no phosphorous, molybdenum, vanadium, copper, element X, element Y or ammonium species.

5. A catalyst for use in the production of methacrylic acid, which is produced by the method claimed in claim 1.

6. A method of producing methacrylic acid, comprising, subjecting methacrolein to vapor phase catalytic oxidization with molecular oxygen in the presence of the catalyst for producing methacrylic acid as claimed in claim 5.

7. The method according to claim 2, wherein the liquid B is a solution or a slurry which contains substantially no phosphorous, molybdenum, vanadium, copper, element X, element Y or element Z.

8. The method according to claim 2, wherein the liquid C is a solution or a slurry which contains substantially no phosphorous, molybdenum, vanadium, copper, element X, element Y or ammonium species.

9. The method according to claim 3, wherein the liquid C is a solution or a slurry which contains substantially no phosphorous, molybdenum, vanadium, copper, element X, element Y or ammonium species.

10. A catalyst for use in the production of methacrylic acid, which is produced by the method claimed in claim 2.

11. A catalyst for use in the production of methacrylic acid, which is produced by the method claimed in claim 3.

12. A catalyst for use in the production of methacrylic acid, which is produced by the method claimed in claim 4.

13. A method of producing methacrylic acid, comprising, subjecting methacrolein to vapor phase catalytic oxidization with molecular oxygen in the presence of the catalyst for producing methacrylic acid as claimed in claim 10.

14. A method of producing methacrylic acid, comprising, subjecting methacrolein to vapor phase catalytic oxidization with molecular oxygen in the presence of the catalyst for producing methacrylic acid as claimed in claim 11.

15. A method of producing methacrylic acid, comprising, subjecting methacrolein to vapor phase catalytic oxidization with molecular oxygen in the presence of the catalyst for producing methacrylic acid as claimed in claim 12.

* * * * *